Jan. 19, 1937. T. B. ENTZ 2,068,267
STORAGE BATTERY SEPARATOR PROTECTOR AND PLATE SUPPORT
Filed Feb. 20, 1934

INVENTOR
Theodore B. Entz
BY
James Harrison Bowen
ATTORNEY

UNITED STATES PATENT OFFICE 2,068,267

STORAGE BATTERY SEPARATOR PROTECTOR AND PLATE SUPPORT

Theodore B. Entz, New Rochelle, N. Y.

Application February 20, 1934, Serial No. 712,265

3 Claims. (Cl. 136—81)

The purpose of this invention is to provide an improvement in the plate supporting means of storage batteries.

In a storage battery it is desirable and necessary that the separators extend beyond the plates at the top, bottom and sides to prevent metallic particles from lodging on the plate edges and contacting with plates of opposite polarity, thus causing an electrical leakage which impairs the efficiency of the battery and causes its eventual breakdown. This lodgement of metallic particles and its growth is commonly termed "mossing". If the plates and separators of a battery cell are held firmly in its container, as is the case in batteries of the portable and submarine type, the separator edges are broken and crushed where they come in contact with the container walls, and they are injured by the movement of the plates, and by vibration, and the plates may shift their position. Any and all of these acts may occur and do occur, thus breaking down the protection the extension of the separators is designed to give to the plate edges.

There are two methods of supporting the battery plates and separators in the container. One is to provide rests on the bottom of the container which tends to crush the bottom of the separators, and provides a ledge where the sediment collects. The other is to suspend the plates and separators from the container cover, which places the entire weight on the cover and makes an expensive design of cover necessary and limits the size and weight of the plates so suspended.

It is necessary to provide means for preventing the separators dropping down and floating up.

The object of my invention is to provide means for protecting the plate edges at the top, bottom and sides, to prevent the crushing of the separator extensions, to prevent the dropping down and floating up of the separators and to support the plates.

Other features and advantages of the invention will appear from the following description taken in connection with the drawing, wherein.

Figure 1:
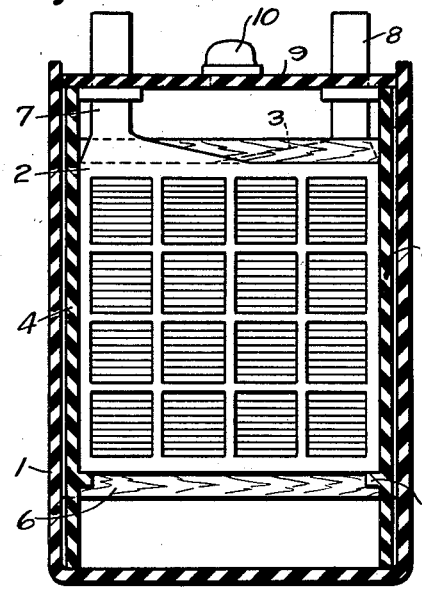
Figure 1 is a view showing a section through a storage battery showing comparatively flat plates supported on lugs and with the separators fitting into openings.
Figure 2:
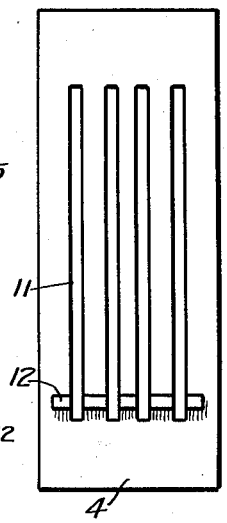
Figure 2 is an end view showing the openings in one of the support plates.
Figure 3:
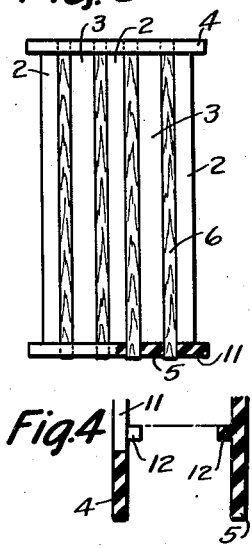
Figure 3 is a plan view showing an assembly of the plates and separators.
Figure 4:
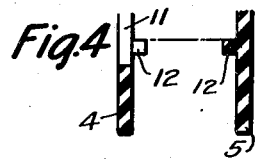
Figure 4 is a detail showing the supporting lugs on the support plates.

In the drawing the battery is shown as it would be made, wherein numeral 1 indicates an outer casing which may be made of glass, rubber or any material, and inside of the casing are plates 2 and 3 which may be held in insulating and acid resisting support plates 4 and 5, and separators 6 may be placed between the plates. The plates 2 and 3 may be of any type or design and may be arranged in any manner. In the design shown they are provided with terminals 7 and 8 which extend upward through a cover plate 9 which may be provided with a filler plug 10, as shown in Figure 1. The supports 4 and 5 may be made as shown in Figure 2 with slots 11 and lugs 12 between the slots and adjacent their lower ends and it will be noted that the plates 2 and 3 will rest on the lugs 12 and the separator 6 will pass through the slots 11, as shown in Figure 3. It will be noted that with this construction mossing around the ends of the plates will be prevented as it will be necessary for the metallic particles to pass from one of the plates through the space between the separator and the edge of the opening 11, around the end of the separator, and back through the support 4 and 5 to the next plate. Therefore, providing a battery with the separators, as indicated by the numeral 6, extending through the support plates 4 and 5, provides a decided improvement in battery construction and will substantially prevent mossing around the ends of the plates.

Figure 5:
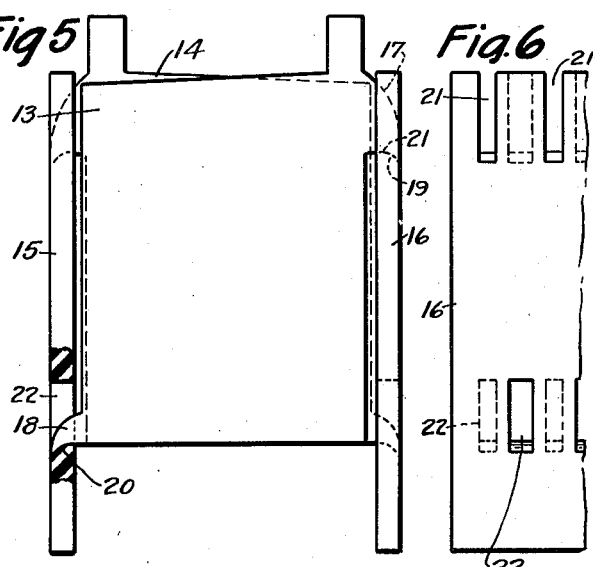
Figure 5 is a view showing an alternate means of holding the plates in the support plates.
Figure 6:
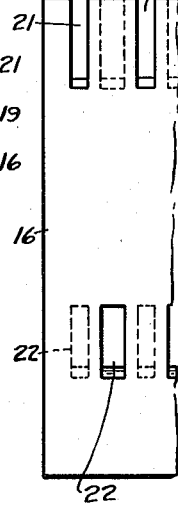
Figure 6 is an end view showing a portion of one of the support plates shown in Figure 5.
Figure 7:
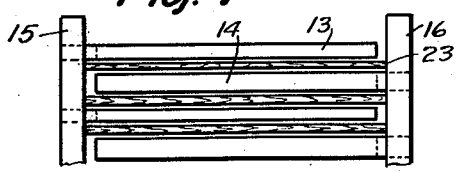
Figure 7 is a plan view showing the arrangement of the plates and support plates shown in Figure 5.

In the design shown in Figure 5 in which the plates are indicated by the numerals 13 and 14 and the support plates by the numerals 15 and 16 the upper edges of one side of the plates are provided with extensions 17 and the lower edges of the opposite side are provided with extensions 18 which have curved lower edges that fit over similarly curved surfaces 19 and 20 in slots 21 and 22, and thereby hold the support plates inward. These slots are alternated as shown in a side view of a portion of the support plates, as shown in Figure 6, in which it will be noted that the upper extension of one plate will be held in a slot 21 and the lower extension of the opposite side will be held in one of the lower slots 22 of the opposite support plate. It will be understood that these extensions and slots may be of any shape or design. It will also be understood that separators, as shown in Figure 1, may be used with these plates and these separators, as indicated by the numeral 23, may extend through the plates, as shown in Figure 3.

Having thus fully described the invention, what I claim as new and desire to secure by Letters Patent, is:

1. In combination with a battery of the storage type, having plates and separators therein, means for locating the plates and separators of the battery so that the separators extend beyond the edges of the plates at the sides and bottom, consisting of support plates having slots extending entirely therethrough to engage and receive the side edges of the separators, said separator edges passing through the support plates in the slots, providing a break in the path of the electrolyte attempting to pass around the side edges of the separators, thereby preventing mossing, and the bridging of metallic particles from one plate to a plate of opposite polarity.

2. A battery as described in claim 1, characterized in that lugs are provided on the support plates between the slots for supporting the battery plates at a considerable distance from the bottom of the battery container, providing an unobstructed chamber in the lower part of the battery for the circulation of electrolyte and the deposit of sediment.

3. A battery as described in claim 1, characterized in that means are provided on the support plates for supporting the battery plates at a considerable distance from the bottom of the battery container, providing an unobstructed chamber in the lower part of the battery for the circulation of electrolyte and the deposit of sediment.

THEODORE B. ENTZ.